(12) United States Patent
Iitsuka

(10) Patent No.: US 6,395,980 B2
(45) Date of Patent: May 28, 2002

(54) BATTERY CASE

(75) Inventor: Yoshitune Iitsuka, Yokohama (JP)

(73) Assignee: Vertex Standard Co., Ltd. (JP)

( * ) Notice: Subject to any disclaimer, the term of this patent is extended or adjusted under 35 U.S.C. 154(b) by 0 days.

(21) Appl. No.: 09/764,537

(22) Filed: Jan. 16, 2001

(30) Foreign Application Priority Data

Jan. 24, 2000 (JP) ...................................... 2000-014356

(51) Int. Cl.$^7$ ................................................ H05K 5/03
(52) U.S. Cl. ............................ 174/50; 174/66; 455/90
(58) Field of Search ......................... 174/66, 50, 17 R, 174/58; 220/33, 241, 38; 361/814; 429/164, 165; 455/90, 127, 343, 99, 100, 123, 573, 575; 379/433, 433.08

(56) References Cited

U.S. PATENT DOCUMENTS

| | | | |
|---|---|---|---|
| 5,001,772 A | * 3/1991 | Holcomb et al. | 455/90 |
| 5,600,223 A | * 2/1997 | Shirai | 320/2 |
| 5,607,791 A | * 3/1997 | Garcia et al. | 429/96 |
| 5,926,545 A | * 7/1999 | Wu | 379/433 |
| 5,935,729 A | * 8/1999 | Mareno et al. | 429/100 |
| 5,955,700 A | * 9/1999 | Slipy et al. | 174/50 |
| 6,120,932 A | * 9/2000 | Slipy et al. | 429/99 |

* cited by examiner

Primary Examiner—Dean A. Reichard
Assistant Examiner—Angel R. Estrada
(74) Attorney, Agent, or Firm—Fulwider Patton Lee & Utecht, LLP

(57) ABSTRACT

In a battery case mounted on electronic equipment, the thickness of the battery case is reduced as obtaining the holding force of batteries with respect to vibration and impact by use of a case main body with a simple structure and a case cover.

A depth of a battery containing portion of the case main body 1 is structured such that a side face of each battery is protruded outwardly than an end face of a frame portion in a state that the batteries 2 are contained. On the other hand, the case cover 10 is formed of plate material covering the side face of each of the respective contained batteries 2, and plate-like magnets 14 and 15 are adhered onto faces opposite to the respective batteries 2.

The case cover 10 is attached to the respective dry batteries by an absorbing force of the plate-like magnets 14 and 15 to share a holding force between the dry batteries, thereby preventing the dry batteries from being detached even if vibration and impact act. Since there is no need to provide an attaching mechanism for the case cover 10 to the case main body 1, a reduction in the battery case can be improved.

13 Claims, 3 Drawing Sheets

BATTERY CASE

BACKGROUND OF THE INVENTION

1. Field of the Invention

The present invention relates to a battery case loaded on electronic equipment, and particularly to a structure for holding batteries reliably as simplifying a case cover attaching system.

2. Description of the Related Art

Conventionally, in a personal handy phone system and a mobile-operated radio apparatus and the like, a battery case containing a plurality of dry batteries or charge batteries is loaded as a power source.

In a desk calculator, a battery case itself is incorporated into a housing of the apparatus as one body beforehand and the cover is detached to load the batteries. However, in this kind of apparatus, unlike the desk calculator, there is used a cartridge-typed battery case, which is composed of a case main body for containing and holding batteries and a case cover, and the case cover is designed to be attached/detached to/from a basic housing side of the equipment.

For example, FIG. 5(A) is an external perspective view of a personal handy phone system, and FIG. 5(B) is a structural view of the main parts. In this case, a print circuit board (PCB) 5 lb with an electronic part 51a is fixed to a basic housing 50, and a battery case 53, which contains six dry batteries 52, is structured to be detachable/attachable from/to a back face of the basic housing 50.

Regarding the attaching method, there is adopted a method in which a stopping portion 54, which is formed to be protruded on an end face of the battery case 53, is inserted into a concave portion 55, which is formed on a contact face with the end face at the side of the basic housing 50, so as to press the battery case 53 to the basic housing 50, so that a lower side is stopped by an elastic supporting mechanism 56.

The battery case 53 is composed of a case main body 57, which contains six dry batteries 52 arranged in parallel, and a case cover 58. The case main body 57 has a depth larger than an outer diameter of each dry battery 52, and a groove for guiding both end sides of the case cover 58. The case cover 58 is inserted into the guide groove and slid in a state that the dry batteries are loaded, whereby covering the containing portion of dry batteries 52.

Regarding the method of attaching the case cover, similar to the method of attaching the battery case 53 to the basic housing 50, there is a method in which one end is used as a stopping mechanism and the other end is used as an elastic supporting mechanism.

Additionally, if the depth of the case main body 57 is larger than the outer diameter of dry battery 52, there occurs difficulty in taking out the batteries 52 from the case in some instances. For this reason, there is provided such a contrivance in which a belt-like cloth is put down in the arranging direction along the lower side of batteries 52 and one end of the belt-like cloth is pulled, whereby taking out all batteries from the case.

It is needless to say that the role of the case cover 58 is to prevent the batteries 52 of the case main body 57 from being detached from the mounted state because of vibration and impact acting on the equipment. Particularly, since the personal handy phone system and the like are frequently subjected to vibration and impact, the role that the case cover 58 of the battery case 53 should play is important.

By the way, though this is demanded to the electronic equipment on the whole, in the personal handy phone system and the mobile-operated radio apparatus wherein the battery case is mounted and used as a power source, the volume of the battery case, which occupies in the housing, is large. For this reason, it is strongly desired that the battery case be miniaturized and thinned.

Regarding this point, in the battery case 53 shown in FIG. 5, since the case cover 58 is inserted into the guide groove formed on the side of the case main body 57, the thickness of battery case 53 is increased because of the structure of the guide portion.

Also, as mentioned above, since the depth of the case main body 57 is larger than the outer diameter of each dry battery 52, various kinds of contrivances must be provided at the time of taking out the dry batteries 52.

Moreover, the battery case 53 is manufactured by resin mold working. However, the mold becomes complicated because of the provision of guide portion, resulting in an increase in manufacturing cost for this reason.

In addition, these problems apply to the case of using the method in which one end of the case cover is latched and the other end is stopped by the elastic supporting mechanism.

In view of the aforementioned points, the present invention pays attention to the point in which the outer cylinder of dry batteries or charge batteries are made of steel, and an object of the present invention is to provide a battery case, which can prevent batteries from being detached from a case main body easily even if vibration and impact act on equipment, whereby solving the above-mentioned problems.

SUMMARY OF THE INVENTION

The present invention relates a battery case, which is mounted on electronic equipment in a state that a plurality of batteries are contained, wherein the battery case comprises a case main body and a case cover, a depth of a battery containing portion of the case main body is structured such that a side face of each battery is protruded outwardly than an end face of a frame portion in a state that the batteries are contained, the case cover is formed of plate material covering the side face of each of the respective contained batteries, and plate-like magnets are adhered onto faces opposite to the respective batteries.

According to the present invention, the case cover is attached to not the case main body but the side face of each of the batteries by the absorbing force of the plate-like magnets.

Therefore, the case cover exerts the function of sharing the holding force of individual batteries in the case main body mutually, and prevents the batteries from being detached from the case main body easily even if vibration and impact act.

Then, since it is unnecessary to provide the attaching mechanism of the case cover to the case main body, a reduction in the thickness of the battery case can be implemented.

Moreover, the side portion of each battery is protruded outwardly than the end face of the frame portion. For this reason, in order to take out the batteries, the fingertips may be put on the end face of each dry battery to pull out each battery, thereby eliminating the need for providing special measures and the mechanism.

In addition, the outer portions of areas, which are opposite to the respective batteries, may be bent to the case main body side, and this makes it easy to perform the attachment of thecase cover and to prevent the shift, and this provides an excellent case cover in the design.

Moreover, the case cover is formed as a corrugated plate corresponding to the protruded side face of each battery, and the soft plate-like magnets are adhered along the corrugated face. This structure brings about merits in which the absorbing force to each battery of the case cover is increased so that the holding function can be strengthen and thinner plate-like magnets can be adopted.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

A battery case according to the preferred embodiments of the present invention will now be described specifically with reference to FIGS. 1 through 4.

(First embodiment)

Figure 1:
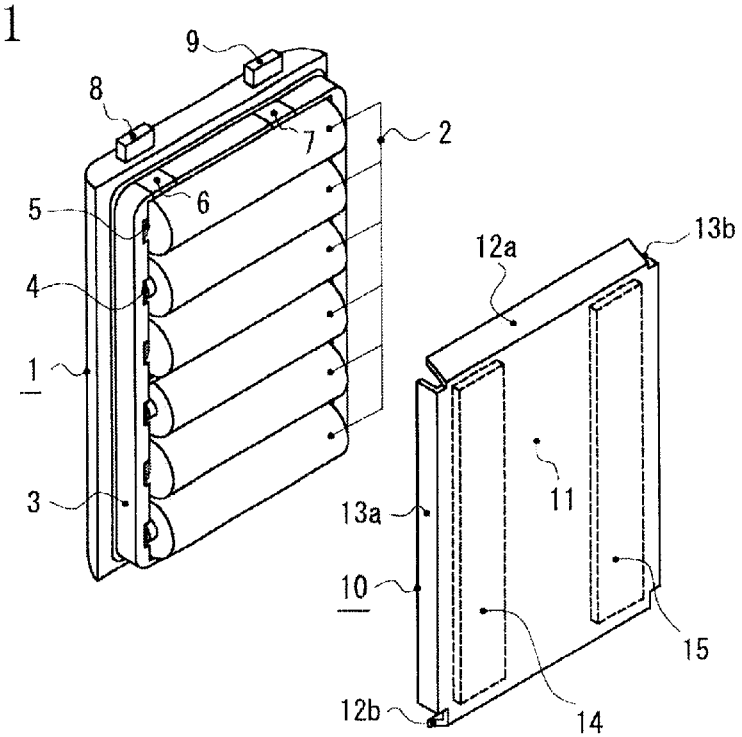
FIG. 1 is an external perspective view showing a case main body of a battery case and a case cover according to a first embodiment.
Figure 5:
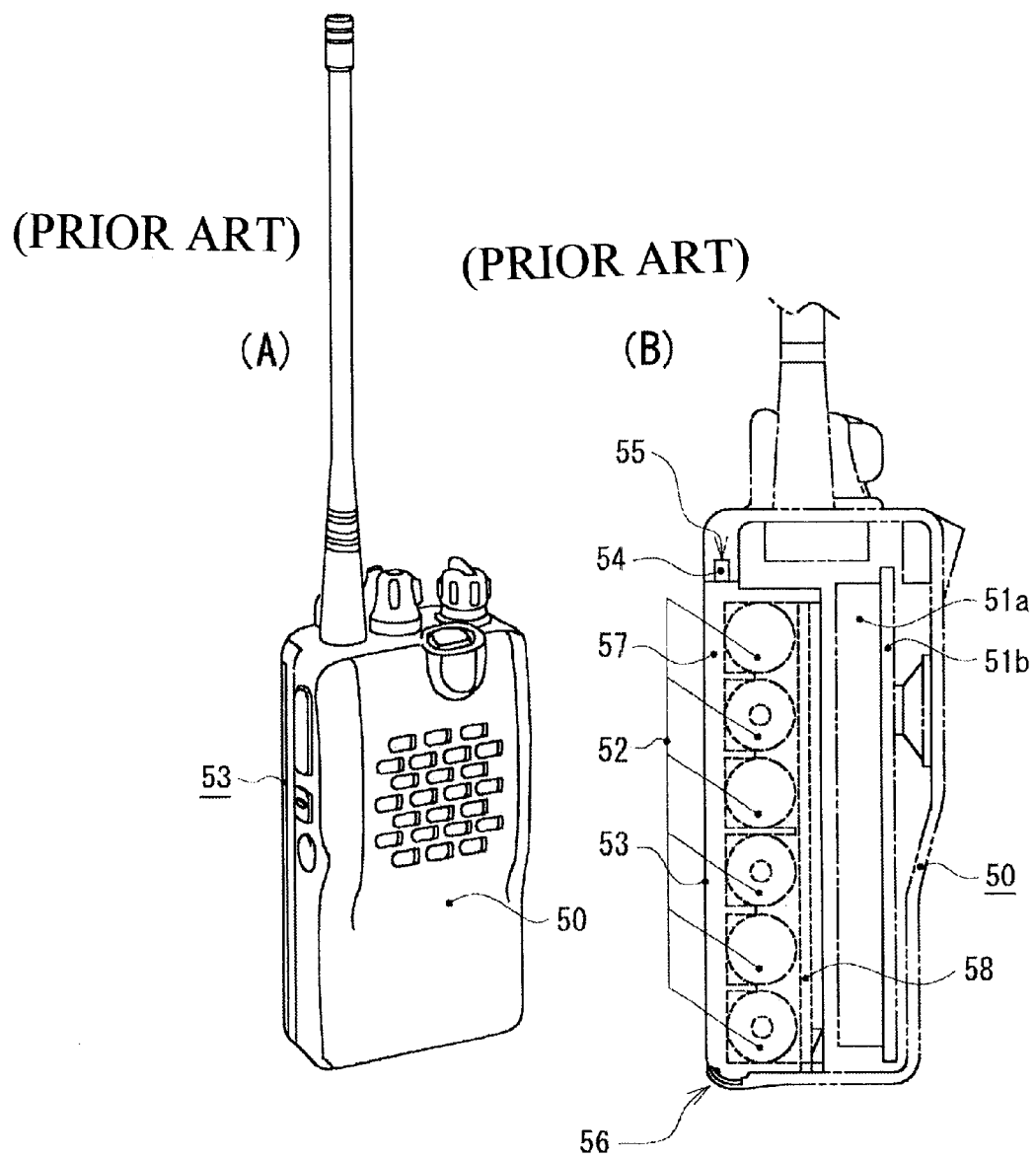
FIG. 5(A) is an external perspective view of a conventional personal handy phone system.
FIG. 5(B) is a side view of the main parts to show a state in which a battery case is attached to the same conventional system.

First, FIG. 1 is an external perspective view showing a case main body (state in which dry batteries are contained) of a battery case, which is applied to the personal handy phone system shown in FIG. 5(A), and a case cover according to a first embodiment. In this figure, numeric symbol 1 denotes a case main body, which contains six dry batteries 2, similar to a case main body 57 of FIG. 5(B).

In addition, the battery case of this embodiment is different from the case main body 57 of FIG. 5(B) in the following points.

Namely, a depth of a containing area of dry batteries 2 in the case main body 1 is shallow, and a side peripheral face of batteries 2 protrudes outwardly than an end face of a frame portion 3, which defines the area.

Then, electrodes of the respective dry batteries 2 come in contact with terminals formed on the frame portion 3 (a positive pole is a plate-like terminal 4 and a negative pole is a conical coil spring 5), respectively, and the dry batteries 2 are held in the case main body 57 by urging force of the coil spring 5.

Moreover, the positive and negative poles 4 and 5 are connected to common conductive plates (not shown) to be guided to common terminals 6 and 7, which are formed on the frame portion 3, respectively.

In addition, numeric symbols 8 and 9 correspond to the stop portion 54 of FIG. 5(B).

On the other hand, the case cover 10 is molded by press-working thin metallic plate (such as aluminum plate, steel plate and the like). Its central face portion 11 has a size corresponding to the arranging area for batteries 2 of the case main body 1. Frame piece portions 12a, 12b, 13a, 13b, which are continuously bent on an outer peripheral edge portion, are formed such that their end portions are opposite to the end face of the frame portion 3 of the case main body 1.

Then, two magnetic plates 14 and 15 are adhered onto attaching side surfaces at the central face portion 11 of the case cover 10.

In this embodiment, the respective magnetic plates 14 and 15 are belt-like plates, which are positioned in a state that the arranging direction of the batteries 2 of the case main body 1 is set to a longitudinal direction. They are adhered onto the positions close to both ends of the central face portion 11, respectively.

Additionally, means using double-faced tape or adhesive can be adopted as adhering means.

Figure 2:
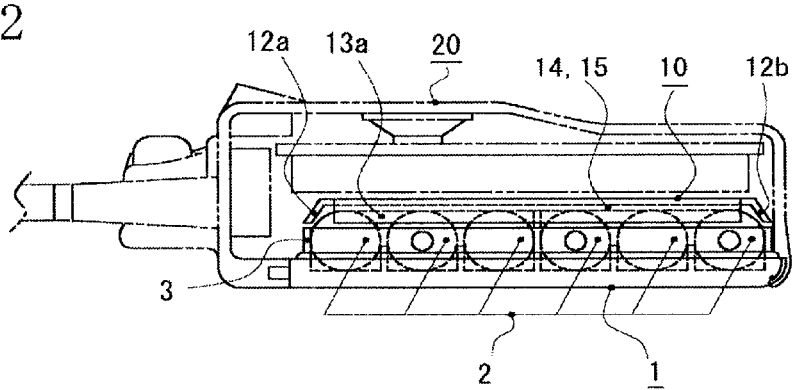
FIG. 2 is a side view of a battery case in a state in which a case cover is attached to a case main body side (a portion indicated by a chain double-dashed line shows a basic housing of a personal handy phone system)

Next, the state in which the case cover 10 is attached to the case main body 1 based on the aforementioned structure is illustrated in FIG. 2.

A portion indicated by a chain double-dashed line shows a basic housing 20 of the personal handy phone system.

Generally, the outer cylindrical portion for dry batteries 2 is made of steel. For this reason, as illustrated in this figure, the magnetic plates 14 and 15 are absorbed to the respective dry batteries 2 only by placing the central face portion 11 of the case cover 10 as close as to the batteries 2, so that the case cover 10 is attached in such a manner that the entirety of the containing area of dry batteries 2 of the case main body 1 is covered.

Moreover, since the case cover 10 has the bent frame piece portions 12a, 12b, 13a, 13b, the position to the case main body 1 is uniquely fixed, the attachment becomes easy, and the case cover 10 can be prevented from being shifted.

By the way, since the magnetic plates 14 and 15 absorbed to the respective dry batteries 2 have rigidity, the holding force to the individual dry batteries 2 are mutually shared in the case main body 1.

In other words, the case cover 10 plays a role in providing the holding force to the individual dry batteries 2 mutually due to terminals 4 and 5 in the case main body 1 so as to prevent the dry batteries 2 from being easily detached from the terminals 4 and 5 even if vibration and impact act.

Then, it is the total thickness of the central face portion 11 and the magnetic plates 14 and 15 that relates to the thickness of the battery case in a state that the case cover 10 is attached. They can be formed of thin plate material.

Therefore, even in comparison with the conventional attaching method shown in FIG. 5(B), the thickness of the battery case can be largely reduced as holding the dry batteries 2 surely with an extremely simple structure.

The above described the features, which the case main body 1 had. However, as is obvious from FIG. 1, the side portion of each of batteries 2 protrudes outwardly than the end face of the frame portion 3 of the case main body 1. For this reason, the respective dry batteries 2 can be easily detached from the case main body 1 only by putting a fingertip on the end face of each electrode side of each dry battery 2 and pulling out each dry battery, and this eliminates the need for providing special measures and means for detaching.

In addition, this embodiment explained the case of the battery case for dry batteries. However, this can be applied to the case of the battery case for charge batteries. Moreover, it is self-evident from the above principle that no limitation of the shape of the outer cylinder for dry batteries or charge batteries is required.

(Second embodiment)

Figure 3:
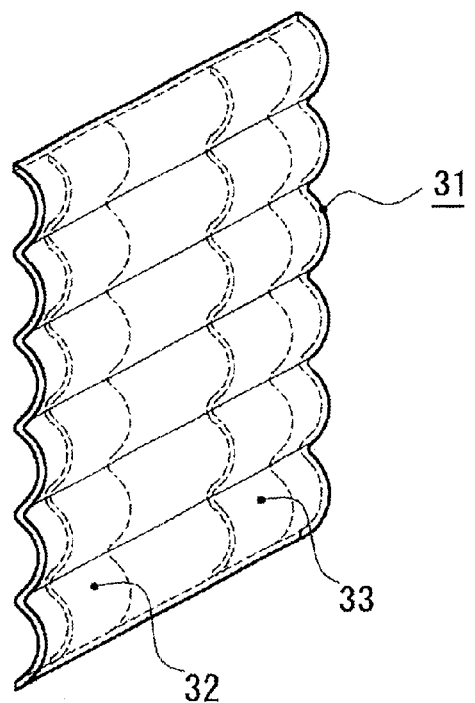
FIG. 3 is an external perspective view showing a case cover according to a second embodiment.
Figure 4:
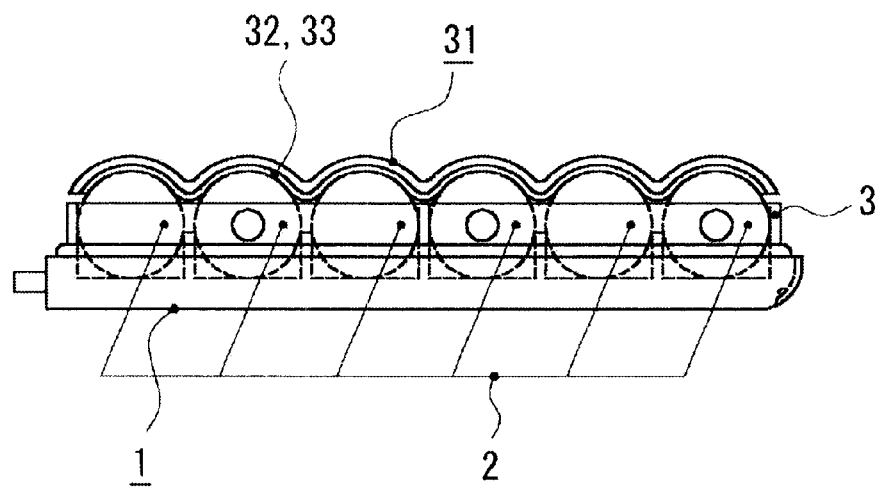
FIG. 4 is a side view of a battery case in a state in which a case cover is attached to a case main body side according to the second embodiment.

This embodiment relates to a modification of the case cover, and the external perspective view is shown by FIG. 3, and the side view, which indicates the state that the case cover is attached to the case main body 1, is shown by FIG. 4.

As shown in FIG. 3, a case cover 31 of this embodiment is structured as a corrugated plate, which corresponds to a part (a part of side peripheral surface of an outer cylinder) protruded outwardly than the end face of the frame portion of the case main body 1 in the respective dry batteries 2 contained in the case main body 2. Soft belt-like magnetic plates (magnetic tapes) 32 and 33 are adhered along the corrugated face.

Then, similar to the case of the first embodiment, attachment of the case cover 31 is attained by covering the respective dry batteries 2 and being absorbed to the respective dry batteries 2 contained in the case main body 1 by use of the absorbing force of the belt-like magnetic plates 32 and 33.

In this case, the belt-like magnetic plates 32 and 33 of the case cover 31 are absorbed along the protruded side peripheral face of each of the dry batteries 2. For this reason, an absorbing area is more increased than that of the first embodiment, and strong absorbing force can be obtained.

Namely, the use of thin material as belt-like magnetic plates 32 and 33 becomes possible, and further reduction in the thickness of the battery case can be implemented as compared with the case of the first embodiment.

Furthermore, the case cover 31 holds the part of the dry batteries 2, and this brings about an advantage in which dry batteries 2 is prevented from being moved by vibration and impact so as to maintain electrode contacting condition well at all times.

The "battery case" of the present invention has the aforementioned structure, and provides the following effects.

More specifically, the invention makes it possible to reduce the thickness of the battery case as obtaining the holding force of batteries with respect to vibration and impact by use of the case main body and the case cover, which can be manufactured with extremely simple structure at reasonable cost.

Moreover, the invention has an advantage in which the detachment of batteries can be easily carried out with fingertips, and this eliminates the need for adding various kinds of means in consideration of the detachment.

The invention makes it easy to attach the case cover to the case main body, and prevents the case cover from being shifted.

The invention makes it possible to apply the thin magnet plates by strengthening the absorbing force with respect to the batteries of the case cover, and implements further reduction in the thickness of the battery case. The invention of claim 3 also makes it possible to obtain an electrode contact, which is strong against vibration and impact.

What is claimed is:

1. A battery case for mounting on electronic equipment and holding at least one battery having opposing side faces, said battery case comprising:

a case main body including a frame defining a battery containing portion having a depth less than a height of said side faces of said battery such that said side faces of said battery, when installed in said battery containing portion, protrude beyond said frame;

a case cover formed of a metallic plate including a face portion covering a portion of said battery, when installed; and plate-like magnets adhered onto said face portion opposite to said battery when said cover is installed on said main body.

2. A battery case for mounting on electronic equipment and holding at least one battery having opposing side faces, said case comprising:

a case main body including a frame having an end face defining a battery containing portion having a depth less than the height of said side faces of said battery such that said side faces of each battery, when installed, protrude beyond said frame;

a case cover formed of a metallic plate including a face portion covering a portion of said battery, said case cover being formed with angled peripheral portions, said peripheral portions being positioned opposite to said end face of said frame when said cover is installed on said main body; and plate-like magnets adhered onto said face portion, said magnets being positioned opposite to said battery, when said cover is installed.

3. A battery case for mounting on electronic equipment and holding at least one battery having opposing side faces, said case comprising:

a case main body including a frame defining a battery containing portion having a depth less than the height of said side faces such that side faces of said battery, when installed, protrude beyond said frame;

a case cover formed of a metallic plate including a face portion covering a portion of said battery, when installed, said case cover being formed as a corrugated plate corresponding to the protruded side face of said battery, when installed; and plate-like magnets contoured to match said corrugated plate and adhered along said face portion of said corrugated plate opposite to said battery when said cover is installed on said main body.

4. A battery case for mounting to electronic equipment and housing a plurality of batteries having a predetermined height and opposing side faces, said battery case comprising:

a main body portion defining a battery receiving compartment with a depth less than said predetermined height for receiving a portion of said batteries;

a case cover having a face portion having a predetermined configuration and including a magnetic element having a configuration complementary to said predetermined configuration for overlying and magnetically retaining said cover to said batteries; and whereby, upon installation of said cover on said main body portion, said side faces of said batteries protrude beyond said main body compartment and said batteries rest against said magnetic element.

5. The battery case as set forth in claim 4 wherein: said predetermined configuration is planar.

6. The battery case as set forth in claim 4 wherein: said predetermined configuration is corrugated.

7. The battery case as set forth in claim 4 wherein:

said magnetic element is adhered to said case cover.

8. The battery case as set forth in claim 4 wherein:

said magnetic element is in the form of a pair of spaced apart magnetic strips.

9. The battery case as set forth in claim 4 wherein:

said main body includes a peripheral frame around said battery receiving compartment; and said case cover includes outwardly extending peripheral flanges for covering a portion of said side faces of said batteries and abutting said frame to inhibit shifting of said batteries when positioned in said battery receiving compartment.

10. A relatively thin case for housing at least one battery for mounting to electronic equipment and comprising:

a case main body having a frame defining a shallow battery receiving recess with a depth less than a height of said battery;

a case cover including a face portion having a first surface for abutting said electronic equipment and a second surface for positioning over said battery, when installed, said case cover including angled peripheral extremities for partially enclosing said batteries;

a magnetic element conforming to at least a portion of said second surface to present a relatively low profile; and whereby said first surface of said case cover may be positioned against said electronic equipment and said battery may be nested in said battery receiving recess and placed against said magnetic element to magnetically retain said cover to said main body to position said battery in electrical communication with said electronic equipment.

11. The battery case as set forth in claim 10 wherein:

said face portion is planar.

12. The battery case as set forth in claim 10 wherein:

said face portion is corrugated.

13. The battery case as set forth in claim 10 wherein:

said magnetic element is in the form of a pair of spaced apart magnetic strips.

* * * * *